Erwin Wiedemann
INVENTOR

INVENTOR
Erwin Wiedemann

United States Patent Office 2,940,029
Patented June 7, 1960

2,940,029
APPARATUS FOR THE AUTOMATIC OPERATION OF THREE-PHASE ULTRA-CENTRIFUGE DRIVING MOTORS

Erwin Wiedemann, Riehen, near Basel, Switzerland, assignor to Sandoz Ltd., Basel, Switzerland Filed June 19, 1959, Ser. No. 821,451

Claims priority, application Switzerland June 19, 1958

4 Claims. (Cl. 318—231)

The present invention relates to apparatus for the automatic operation of a drive for an ultracentrifuge or the like.

The object of the present invention is to provide an apparatus for the automatic operation of an ultracentrifuge in which a three-phase motor is supplied with current of variable frequency. The apparatus is characterized by the fact that electronic means are employed both for the generating of the three-phase current of variable frequency for the current-supply to the motor, and also for the controls of the apparatus which render possible automatic operation thereof. These electronic means make it possible to establish, by a single preselection operation for each quantity, the speed of rotation, which may assume any desired value between zero and more than 80,000 revolutions per minute, and the running-time, which may assume any desired value between zero and many hours. These electronic controls also permit the execution of a test program to be carried out fully automatically, the controls being actuated by closing a switch and then controlling the running up of the machine to a previously chosen speed of rotation. The controls maintain this speed of rotation very accurately within predetermined limits for the previously chosen time, and after expiration of the previously chosen time bring the machine back to a halt again. The apparatus also provides for the possibility of changing the preselected values during the runs at any time and in various ways and for adapting the program to these changes.

The apparatus according to the invention further includes a continuous and direct indication of the preselected values and of the conditions of operation by means of pointers or recorders. When the apparatus is used for the direct drive of an ultracentrifuge, for which it is primarily intended, it may have, in addition to the above-described features, the following additional features: means for continuous measurement of the rotor temperature to an accuracy of $1/10°$ C. and a direct indication thereof by means of a pointer or a recorder; an automatically actuated timer mechanism for the periods of steady operation; and a triggering mechanism, which may be actuated at the time desired, for causing a series of photographic exposures to be taken at predetermined time intervals or for causing other actions to occur.

The triggering mechanism of the apparatus according to the invention is also suitable for controlling auxiliary apparatus for safety purposes, and it can be set to carry out, particularly for the use in the direct drive of ultracentrifuges, for which it is primarily intended, the following additional functions: switching-on and switching-off of a vacuum producing apparatus; switching-on and switching-off of a cooling-water circulation means which under certain circumstances may also include automatic regulation of the temperature or of the quantity of cooling water flow; the opening and closing of a protective casing for the rapidly rotating machine parts; and switching-off of part or all of the apparatus in case of disturbances or interruptions for maintenance.

Apparatus for the automatic operation of motors, as well as for the drive of ultracentrifuges, are known in the art, but the apparatus of the present invention is different from these in a manifold and fundamental manner. It dispenses not only with electromechanical converter groups and their customary control contrivances (which also may be electronic), with consequent additional polyphase-current transmissions, but also with gearings for controlling the speed of rotation. The present apparatus employs in place thereof electronically generated and amplified three-phase current for directly feeding the motor. All requisite variations of this three-phase current with respect to frequency, voltage, and amperage, in amount as well as over the course of time, are completely automatically made in accordance with a preselected running program. The control apparatus at the same time assumes all the additional functions mentioned above and thereby reduces operation to the preselection of the program and a simple establishing of a contact. There are also additional advantages of the apparatus according to the invention, such as its small space requirement, its noiselessness, its freedom from vibrations, and its safety which is assured by mean of the automatic disconnection in the event of disturbances.

Other and further objects of the present invention will become apparent from the following specification and claims taken together with the accompanying drawings, in which

Figure 1:
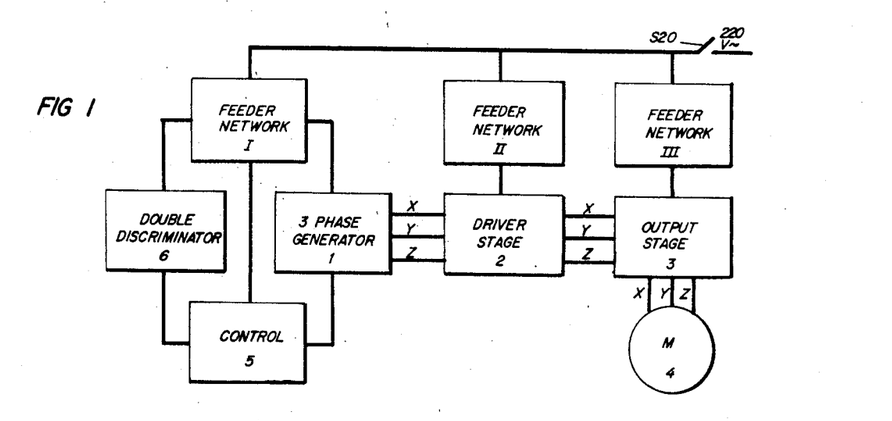
Fig. 1 is a block diagram of the apparatus according to the present invention.

The apparatus of the present invention consists, as shown generally in the block diagram of Fig. 1 of three-phase electronic generator 1 which, by means of a driving stage 2 and an output stage 3 connected thereto, with an initial output of about 2000 watts, feeds a three-phase motor 4, such as may be required for the drive of ultracentrifuge rotors of standard size. The regulation of the running program of the three-phase generator 1 is carried out by a control portion 5, with which there is co-ordinated an electronic double discriminator 6. The control apparatus 5 and the discriminator 6 together carry out all of the additional functions described above. In order to supply the necessary current and voltages to the apparatus, there are provided three feeder networks I, II, and III which are fed from a common source of 220 volt alternating current controlled by switch S20.

Feeder network I (Fig. 7) comprises a transformer $T_1$ having a plurality of taps thereon, a portion of which serve to feed rectifier tubes EZ81, and the remainder of which are taps for supplying power to the control portion 5 and the double discriminator 6. The output of the rectifier tubes is distributed, by means of suitable connections through resistors and inductances to three taps, one of which provides 320 v. and 27 ma. current, the second of which provides 315 v. 24 ma. current, and the third of which provides 283 v. 37 ma. current.

The three-phase generator 1 (Fig. 2) is fed from the 320 v. tap of feeder network I. The generator comprises a tunable oscillator $O_T$, the variable capacitors of which are located in the control portion 5 and are described hereinafter, and a tuned Hartley oscillator $O_F$ of high stability, which is tuned to a fixed frequency in the range of 100 kc. There is provided a phase network which delivers three voltages, displaced in phase from each other by 120°. This network comprises three triodes, $ECH81_U$, $ECH81_V$ and $ECH81_W$, each of which is suitably connected to the power supply through the necessity resistors and capacitors etc., and which is suitably grounded. The output of the fixed frequency oscillator $O_F$ is fed to the first grids of the triodes, while the output of the tunable oscillator $O_T$ is connected to the third grids of the triodes for supplying a voltage thereto which has a single phase. The output of the variable frequency oscillator $O_T$, which output is adjustable from 0 to 1500 cycles, is also filtered and then fed to the triode grids $U_2$, $V_2$ and $W_2$ through three variable potentiometers $U_3$, $V_3$ and $W_3$ in the control portion 5, as described hereinafter, so that a three-phase voltage which is regulable from 0 to 20 volts can be taken off the anodes of the triodes and taken out of the generator at taps X, Y and Z.

Figure 4:
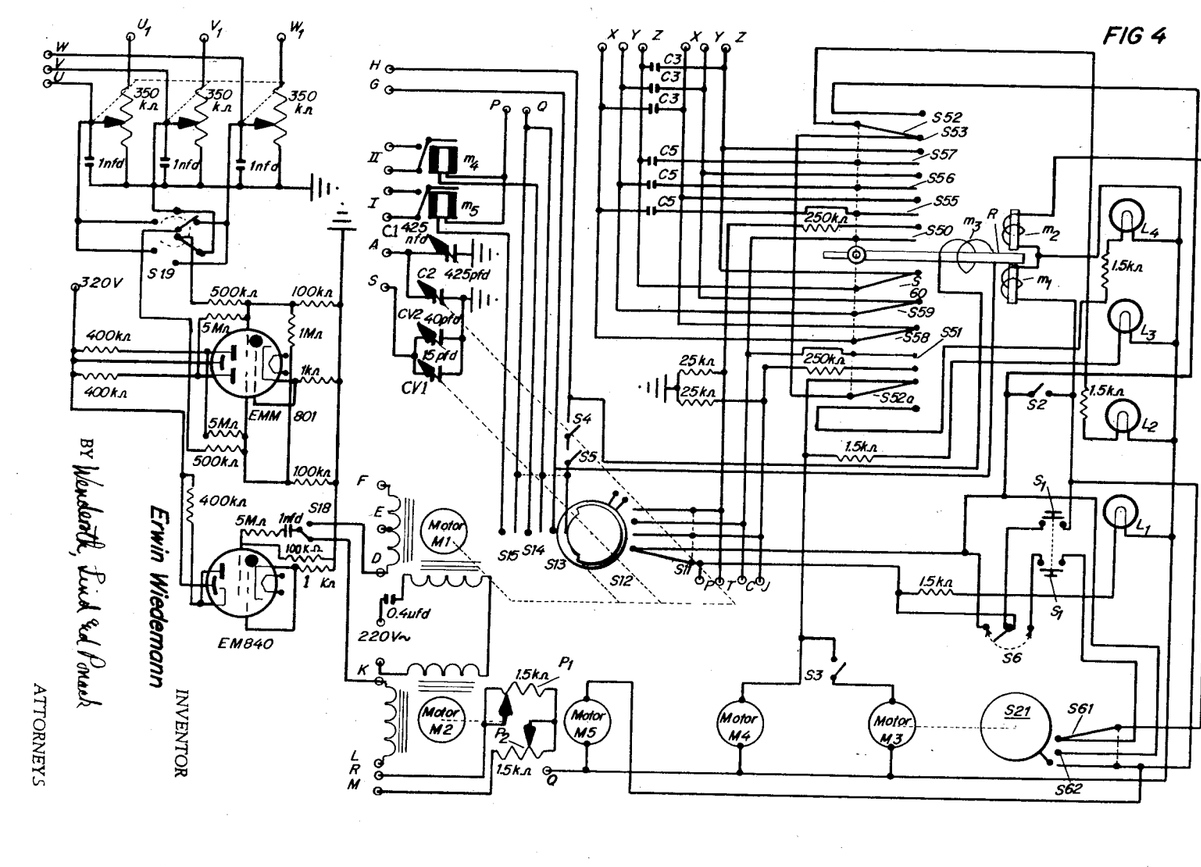
Fig. 4 is a circuit diagram of the control portion of the apparatus according to the present invention.

The control portion 5 of the apparatus comprises a motor M1 which drives ganged controls, one of which operates a variable capacitor $CV_1$ which is connected through a connection S to the tunable oscillator $O_T$ of the generator. The second variable capacitor $CV_2$, the capacitance of which is variable by hand, is also connected through the tap S to the tunable oscillator $O_T$, the total capacitance acting on the oscillator $O_T$ being $CV_1+CV_2$.

Figure 3:
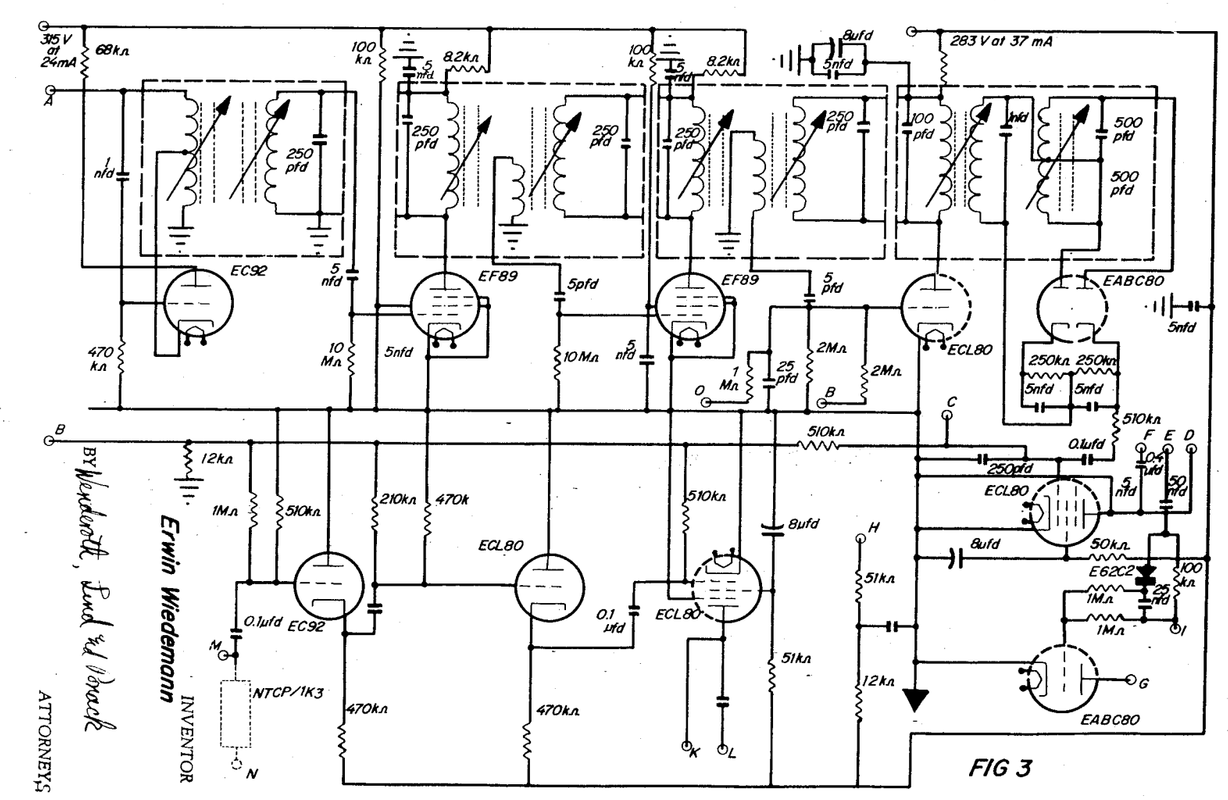
Fig. 3 is a circuit diagram of the double discriminator portion of the apparatus according to the present invention.
Figure 7:
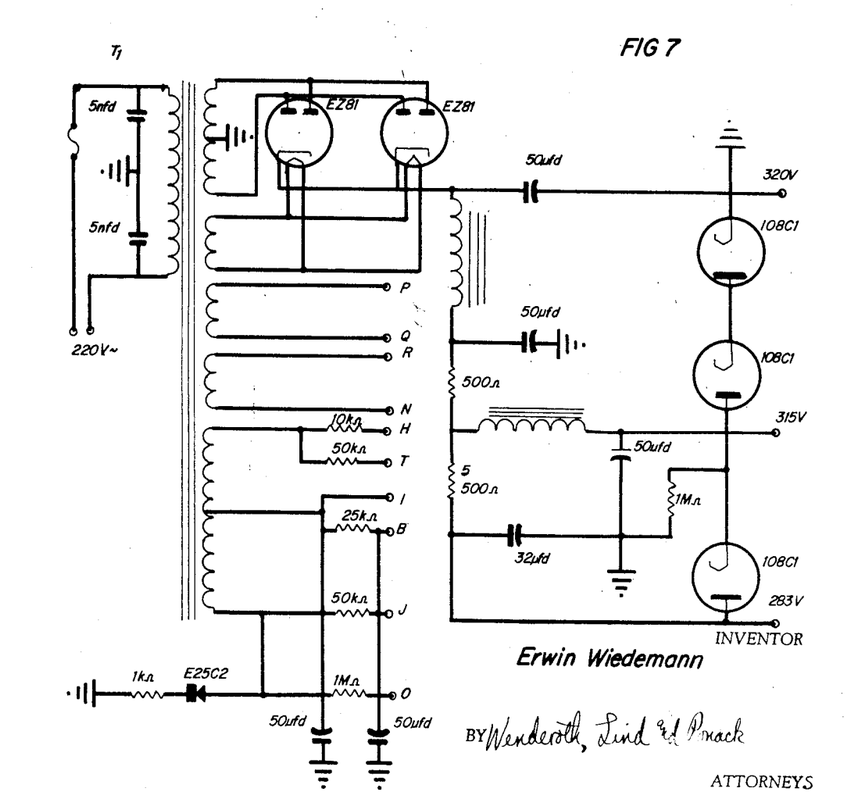
Fig. 7 is a circuit diagram of the feeder network for the three-phase generator, the double discriminator and the control portions of the apparatus.
Figure 8:
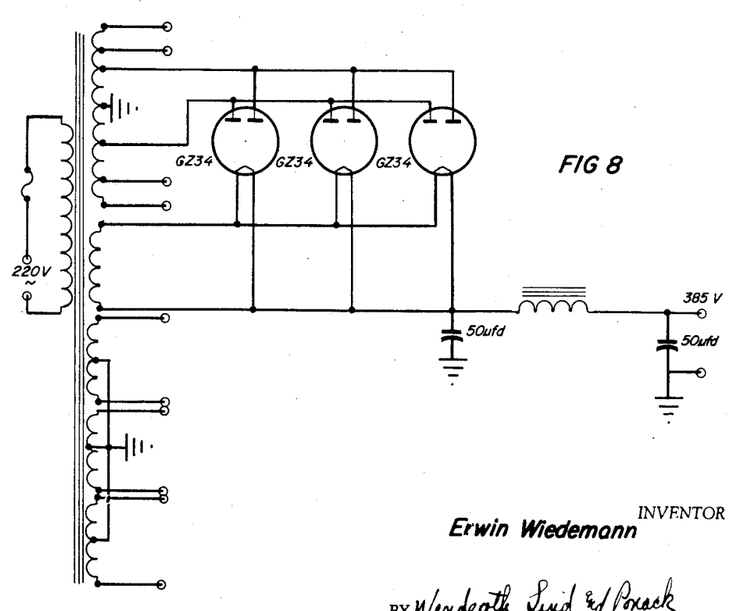
Fig. 8 is a circuit diagram of the feeder network for the driver stage of the apparatus.

The motor M1 is a rotating field motor, having one winding energized directly by a 220 v. alternating current. The other winding is controlled by a first portion of the double discriminator 6 (Fig. 3). This portion of the double discriminator comprises a single phase Hartley oscillator $O_H$ which is tunable in the range of 470 kc. by means of two adjustable rotary capacitors $C_1$ and $C_2$ in the control portion. The rotary capacitors $C_2$ is adjusted by a part of the ganged controls actuated by the motor M1, while the capacitor $C_1$ is adjusted by hand. One-half of the total capacitance of these two capacitors, i.e.

$$\frac{C_1+C_2}{2}$$

corresponds to the intermediate frequency of the oscillator $O_H$, and is fed to this portion of the double discriminator through the tap A from the control portion of the apparatus. The output of the oscillator $O_H$ is amplified through two stages, each having a tube EF89 which is energized by appropriae connections to the 315 v. tap of the feeder network I. The tube EC92 forming part of the oscillator $O_H$ is likewise powered from the 315 v. tap. The amplified stages are tuned to the frequency of the oscillator.

The output of the amplifier stages is fed to the triode portion of tube ECL80, in which it is modulated by a first 50 cycle A.C. voltage impressed on the triode through the tap B from the feeder network I. The output of the triode portion of tube ECL80 is then fed to a Riegger discriminator in which in the first portion of a tube EABC80 the output is demodulated to leave a 50 cycle A.C. voltage, the phase position of which depends upon its difference from the tuning of the discriminator. Upon this 50 cycle A.C. voltage there is superimposed a second 50 cycle alternating current voltage from the tap C of the control portion 5. The phase of this second voltage may be chosen to be the same or opposite to that of the first 50 cycle A.C. voltage, and is determined by means of a switching arrangement in the control portion 5 which will be described hereinafter. The sum or the difference of the A.C. voltages is then amplified in the pentode portion of tube ECL80 and is fed to the second winding of the rotating field motor M1 in the control portion 5 through the taps D, E and F. An electronic relay in the form of a second portion of tube EABC80 is provided in the first portion of the discriminator which serves to disconnect the second 50 cycle A.C. voltage when the phase of the first and second A.C. voltage is different. The disconnection takes place when the discriminator is tuned. The relay is energized through the tap I from the feeder network I, and is connected through the taps G and H to the control portion 5.

Figure 2:
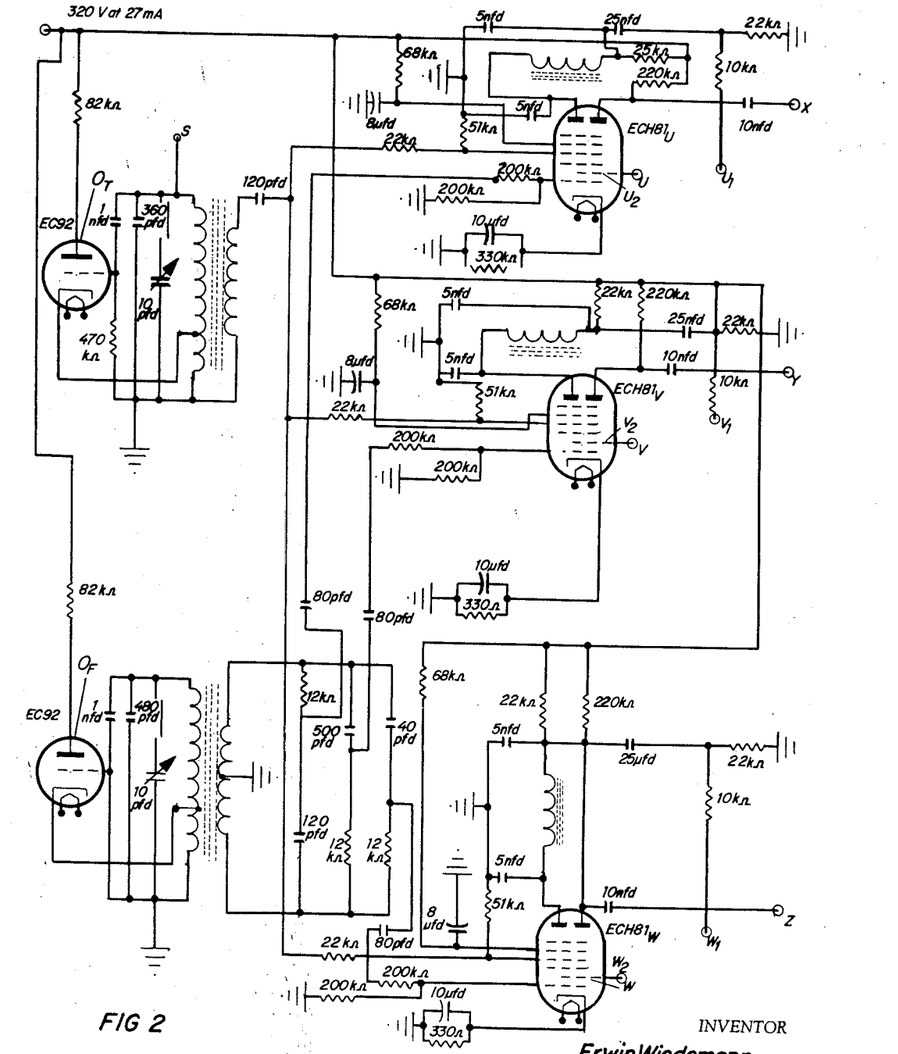
Fig. 2 is a circuit diagram of the three-phase generator portion of the apparatus according to the present invention.

Consequently, if the tuning capacitor $C_1$ in the control portion 5 is set at any desired setting, and the phase of the second 50 cycle A.C. voltage is chosen and the connections to the motor winding DEF for the motor M1 are made so that upon the apparatus being energized the tuning capacitor $C_2$ is moved by the ganged controls of motor M1 toward the value of a capacitance which when added to the capacitance previously set on capacitor C, causes the capacitances to equal the value $$\frac{C_1+C_2}{2}$$

i.e. the tuning point of the discriminator (470 kc.), the electronic relay will be switched and cut out the second 50 cycle A.C. voltage. The 50 cycle A.C. output of the discriminator, which will still be fed to the winding of the rotating field motor M1 will then take over and tune the capacitor $C_2$ to the point where there is zero-passage of current from the discriminator through the field winding of motor M1, and will continue to so tune the capacitor $C_2$ to prevent deviation from this point. The tuning capacitor $CV_1$ for the three-phase generator also being movable by the ganged controls of the motor M1, all possible frequencies may be produced by the three-phase generator, and consequently all speeds of rotation of the motor 4 can be obtained by a setting of the rotary capacitor $C_1$, the speed being attained after the apparatus is energized and then automatically being maintained.

Moreover, since capacitor $CV_2$ can also be varied by hand, one may change the speed of the motor for the ultracentrifuge by changing the setting of capacitor $CV_2$ once a speed has been established by the setting of the position of capacitor $CV_1$ by the ganged controls moved by motor M1. A change in the capacitance of capacitor $CV_2$ will change the total capacitance of $CV_1$ and $CV_2$, and will thus vary the frequency of oscillator $O_T$. The discriminator will also maintain the change speed resulting from such a change of capacitor $CV_2$.

The second 50 cycle A.C. voltage which is supplied to the tap C in the first portion of the double discriminator is controlled by a magnetic relay R and the circuits associated therewith in the control portion 5 (Fig. 4). An alternating current voltage is supplied to the taps T and J from opposite ends of a winding of the transformer $T_1$ in the feeder network I (Fig. 7) and is led to contacts of contact switches S50 and S51 on opposite sides of the relay arm of the relay R. The other contacts of both contact switches are connected to the tap C of the control portion 5 which in turn connects with the discriminator. The arm of the magnetic relay R is moved about a pivot at the left-hand end thereof, movement in the upward direction serving to connect the proper phase of the second 50 cycle A.C. voltage to the discriminator. This direction of movement is controlled by the switch S6. Power from tap P on the transformer $T_1$ of the feeder network is led to either side of switch S6, and then through a double starting switch S1, both contacts of the starting switch being closable simultaneously. The circuits from the portions of the double switch are then led to the coils $m_1$ and $m_2$. From each of these coils there is a common lead to the tap Q and thence back to the coil on transformer T. Movement of the switch S6 to the right causes the upper coil $m_2$ to be energized, thus closing the contacts of contact switch S50. The voltage supplied from tap T is thus fed to the discriminator through the tap C.

When the switch S6 is moved to the left, on the other hand, by a contact of S1 the lower coil $m_2$ is energized, thus pulling the arm of the magnetic relay R down. This closes the contacts of contact switch S51, and thereby connects the tap J of the transformer T1 to the tap C of the double discriminator. This causes a voltage of the opposite phase to be fed to the discriminator, which in turn causes the motor M1 to move in a direction away from the turning point of discriminator 6 and to change the capacitance of the capacitor $CV_1$ to reduce the speed of the motor 4.

Once the circuits have been established by the movement of the switch S6 to the right, and the double switch S1, the starting switch, is momentarily closed, the coil $m_2$ in the magnetic relay R is energized. The magnetic relay R will thus be held in the desired position and the motor spins up further until the electronic relay disconnects the second 50 cycle A.C. voltage when the discriminator is tuned, as described above. At this time, the holding coil $m_3$ is deenergized, and since the double starting switch S1 is no longer closed, the arm of the magnetic relay R returns to the midposition, as shown in the drawing.

It will be observed that the switches S4 and S5 are in the circuit from the electronic relay to the holding coil $m_3$. These switches may be connected to the casing of the ultracentrifuge and to the vacuum producing means respectively, so that they are closed when the ultracentrifuge casing is not closed and when the vacuum producing means is not in operation. They therefore insure that the holding coil $m_3$ will not be energized and motor 4 will not continue to operate unless these conditions are properly set.

In addition, a normally open safety switch S2 connected in the cooling water supply is positioned in the circuit for coils $m_1$ and $m_2$ so that should the cooling water supply fail, the switch S2 will close and energize coil $m_1$ and the apparatus will be braked to a halt.

There is also provided a lamp L1 connected across the power supply to the control portion 5 which is illuminated when power is supplied thereto. Also provided are lamps L2 and L4, the lamp L2 being energized by the closing of the contacts of contact switch S52 when the arm of the magnetic relay R is moved up, and the lamp L4 being energized by the contact of the switch S52a when the arm of the magnetic relay R is moved down. Thus, when the control portion 5 is set to supply the second A.C. voltage of the proper phase to the discriminator for running the motor M1 to bring the ultracentrifuge up to the proper running speed, the lamp L2 will be lit, thus indicating that the device is running up. As has been noted, the opposite position of the arm of the magnetic relay R, in which position lamp L4 will be lit, corresponds to the braking portion of the operation.

Provided in the lines between tap P and the switch S6 is a contact switch S11 which may be actuated by a terminal switch disc S10 which is operated from the ganged controls by the motor M1. The terminal switch disc S10 is positioned so that the switch S11 will be opened should the motor of the ultra-centrifuge come to stillstand, thus setting the apparatus to rest excepting L1.

Coaxially mounted with the terminal switch disc S10 may be a cam switch S12 which actuates a plurality of contacts S13, S14 and S15. Contact switch S13 is closed by the cam switch S12 at a predetermined upper speed limit of the ultra-centrifuge motor, thereby shorting out the holding coil $m_3$, and thus permitting the arm of magnetic relay R to assume a middle position. Contact switch 15 is closed at the frequency zero thus setting the motor to stillstand.

When the second 50 cycle alternating current voltage is disconnected by the electronic relay and the arm of the magnetic relay R is permitted to assume the midposition, the contacts of contact switch S53, which have up to this point been held open by reason of the arm being in the upper position, are closed. If the continuous run switch S3 is closed, this completes a circuit through the synchronous motor M3, the motor M3 being connected to a programing means S21 for rotating it. The programing means is calibrated so that by rotating it in a direction opposite to the direction in which it is moved by motor M3, it will take a given amount of time to be rotated back again at the speed at which it is moved by motor M3. At the same time, the circuit through synchronous motor M4 is completed, this motor being connected to a timer or revolutions counter (not shown) for keeping the time or revolutions of the continuous speed run. With the closing of the switch S53, a circuit is also completed through the lamp L3, the lighting of which indicates running of the ultra-centrifuge at a steady speed. Since the contacts of switch S52 will be opened when the arm of the magnetic relay R is returned to the central position, the lamp L2 will no longer be lit.

Positioned to be actuated by switch actuating means on the programing means S21 are switches S61 and S62. Switch S61 is normally closed, and is connected in a circuit between the tap P and the coil $m_2$ so that coil $m_2$ is energized when switch S61 is closed. The switch S62, which is likewise normally open, is connected in a circuit which includes the synchronous motor M5, and energizes motor M5 when it is closed. The motor M5 is connected to the timer or revolutions counter for moving it in the opposite direction from the direction in which it is moved by the motor M4.

Also included in the control portion of the apparatus is a temperature indication means which comprises a motor M2 having one field winding supplied from a 220 volt alternating current source and having a variable field winding supplied from taps K and L. The motor M2 drives a variable potentiometer $P_1$ which is one resistance in a 6.3 volt alternating current measuring bridge. The remainder of the bridge consists of the potentiometer $P_2$, the coil with taps R and N of transformer $T_1$, and a heat responsive resistance $NTCP/1K3$ which is a resistance the value of which is changed by a change in temperature, and which is located at the point in the ultracentrifuge at which temperature is to be measured. At the point of the bridge between the resistance $NTCP/1K3$ and the potentiometer $P_2$, there is connected the second portion of the double discriminator which is comprised of three stages EC92 and two stages of ECL80, in which the residual current of the bridge is amplified approximately 9,000 times. From the third stage the amplified residual current is connected to taps K and L of the variable field winding of the motor M2. The variable potentiometer $P_1$ has connected thereto a temperature indicating means which is moved at the same time that the potentiometer is moved by the motor M2.

The connections K and L of the field winding of the motor M2 are made such that the motor M2 moves the potentiometer $P_1$ to balance the bridge. Since reversal of the phase of the current in the bridge takes place at the balance point, temperature changes which affect the resistance $NTCP/1K3$ will also change the resistance of the bridge so that the motor M2 drives the potentiometer $P_1$ in the proper direction, regardless of which way the temperature change unbalances the bridge.

Also included in the control portion of the apparatus are the three variable potentiometers $U_3$, $V_3$ and $W_3$, the input to which comes from the taps $U_1$, $V_1$ and $W_1$ in the three-phase generator, and the output of which is fed to the triodes in the three-phase generator through taps U, V and W.

Also included in the control portion of the apparatus are means for checking whether the motors M1 and M2 are properly positioning the variable capacitors and the variable potentiometer so that they are holding the speed of the motor 4 for the ultracentrifuge at the correct speed and that the temperature is being indicated correctly. This means comprises a tuning tube EM840, to which power is supplied from the 320 volt output of the feeder network I, and has a grid which can be connected either to the variable field winding of the motor M1 or the variable field winding of the motor M2 by means of switch 18. The tube is connected in the circuit such that when the motors M1 and M2 are properly positioning the capacitors $C_2$ and $CV_1$ and the potentiometer $P_1$, at which point the current flow in the variable field windings should be zero and motors at rest, the tube EM840 will have the least glow.

There is further provided a tuning tube EMM801 which is likewise supplied with power from the 320 volt output of feeder network I, and has two grids, each of which can be connected to a separate phase of the output of the three-phase generator by means of the switch S19. When the phases are properly synchronized and balanced, the glow of the tube EMM801 will be a minimum and the intensity of the glow of the two grids will be equal.

A further portion of the control portion of the apparatus consists of two pluralities of contact switches, S55, S56 and S57, and S58, S59 and S60. Contact switches S58 and S55, when closed, connect two taps, one of which is connected to the output X of the three-phase generator 1 and the other of which is connected to the portion of the driver stage 2 for the amplification of the first phase. Contact switches S59 and S56 are similarly connected to the Y output tap of the three-phase generator 1 and the driving stage 2, and contact switches S60 and S57 are connected to the Z taps. In each of the circuits closed by the switches S58, S59 and S60 is a condenser C4, while in each of the circuits closed by the contact switches S55, S56 and S57 is a condenser C5. Between the leads from the three-phase generator 1 and the leads to the driver stage 2 are condensers C3. When the arm of the magnetic relay R is in the midposition, contact switches S58, S59 and S60 are closed, and when the arm is in the lower position, i.e. the running up position, the switches S55, S56 and S57 are closed. This arrangement serves for the automatic balancing of the three-phases of the current supply to the driver stage 2.

Figure 6:
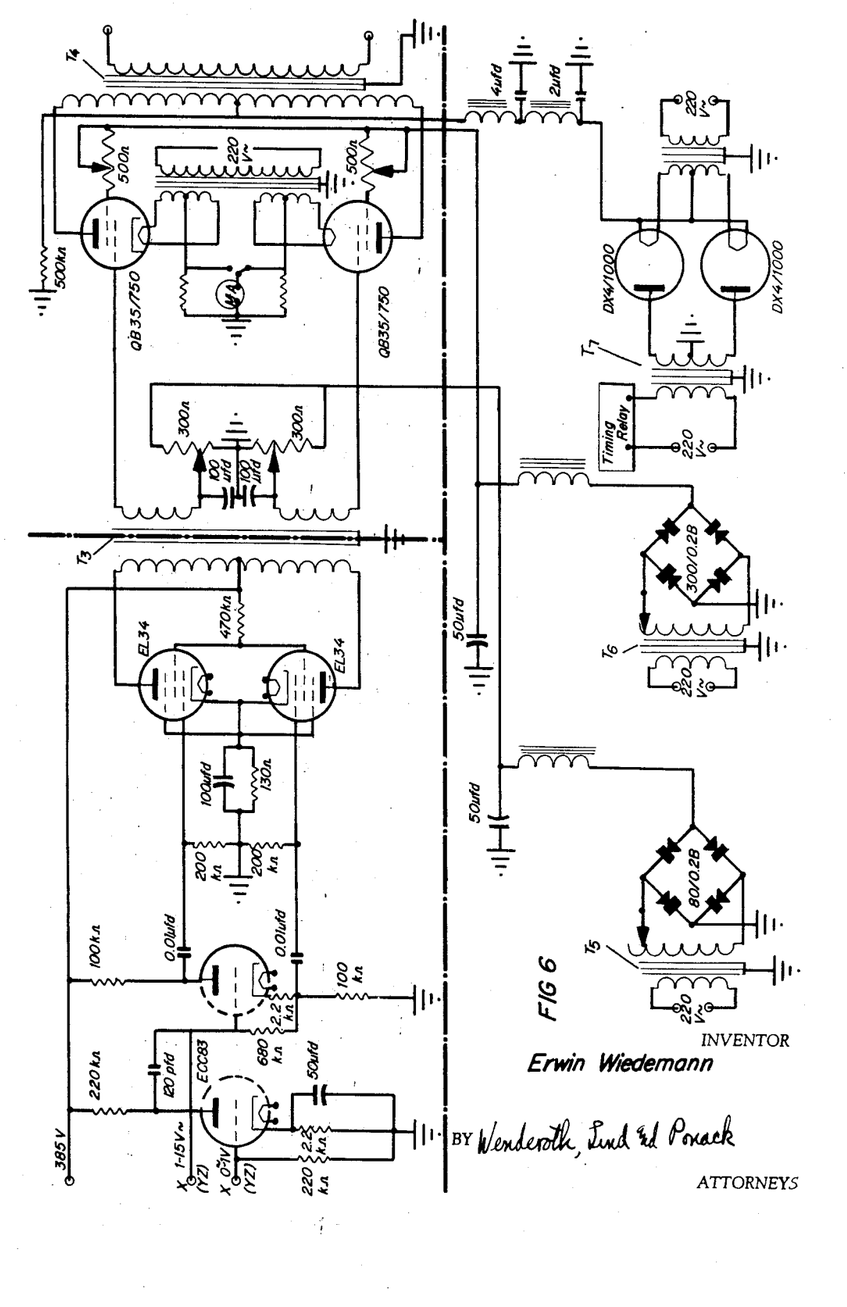
Fig. 6 is a circuit diagram of the driver stage and the output stage of the apparatus according to the present invention, and including the feeder network therefor.

Shown in Fig. 6 is the combined driver stage 2, output stage 3, and feeder network III for the X phase of the supply for the ultracentrifuge motor 4. Both the driver stage 2 and the output stage 3 comprise amplifier groups connected for push-pull amplification, and joined by means of transformer $T_3$. The output stage 3 is connected to the motor 4 through the transformer $T_4$. The rectified voltage for the power supply to the driver stage 2 and the tube ECC83 and push-pull stages EL34 is supplied from the feeder network II with transformer $T_2$ and rectifier tubes EG34. The feeder network III for supplying the power for the output stage comprises two bridge circuits fed from transformers $T_5$ and $T_6$, and a rectifier $DX_4/1000$ fed from transformers $T_7$ and $T_8$.

The driver stage 2, output stage 3 and feeder network III for the Y and the Z phases are identical with that for the X phase as shown in Fig. 6. The outputs from the three-phases may be connected to the motor for the ultracentrifuge in either a star or a delta type connection.

Figure 5:
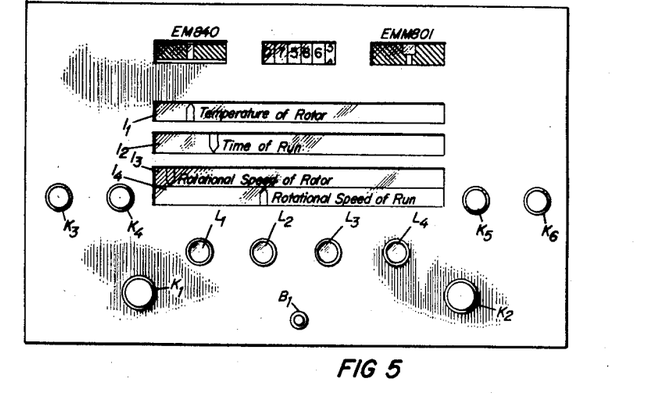
Fig. 5 is a plan view of the control panel of the apparatus according to the present invention.

The control panel shown in Fig. 5 comprises the actuating button B1 for the starting switch S1, the four lamps L1, L2, L3 and L4, a double knob $K_1$ for setting the position of the variable capacitors $C_1$ and $CV_2$, the knob $K_2$ for setting the programing means S16, switch knob $K_3$ for setting the switch S18 and switch knob $K_4$ for setting the switch 19, the knob $K_5$ for setting the position of switch S6 and the knob $K_6$ for setting the position of continuous run switch S3. Indicators $I_1$, $I_2$, $I_3$ and $I_4$ are provided which indicate various conditions relating to the ultracentrifuge. Indicator $I_1$ indicates the temperature which is measured by the temperature indication means, and is driven by the motor M2 at the same time it drives the variable potentiometer $P_1$. Indicator $I_2$ indicates the time at which the ultracentrifuge is to be operated at the steady speed, and is moved by the knob $K_2$ as the knob is rotated to move the programing means S21. Indicator $I_3$ indicates the actual speed of the rotor driven by the motor M4, and indicator $I_4$ indicates the speed at which the rotor has been set to run by the knob $K_1$ as it is rotated to set the capacitors $C_1$ and $CV_2$.

The operation of the device is commenced by first energizing the apparatus by closing switch S20, at which point lamp L1 will be illuminated and the feeder networks will supply power to all of the electronic components. One portion of the knob $K_1$ is then set in order to move the variable capacitor $C_1$ to a position such that the oscillation of the variable oscillator $O_T$ will produce the proper oscillations for the desired speed of the motor 4. This speed is shown on indicator $I_4$. The timer knob $K_2$ is then set to set the programing means S21 for the length of time that the material being centrifuged is to be run at the predetermined steady speed. This time is indicated on indicator $I_2$. With the knob $K_5$ set so that the switch S6 is in the running up position (to the right) and with the casing of the ultracentrifuge closed to close the switch S4 and with the vacuum producing means switched on to close the switch S5 and with the cooling water flowing to open switch S2 and with automatic timing switch S3 closed by means of knob $K_6$, the starting switch S1 is closed by pressing button B1. This energizes the coil $m_2$ moving the arm of the magnetic relay R up and closing contact switches S50, S52 and S55, S56 and S57 and opening contact switches S53, S54 and S58, S59 and S60. The closing of the switch S50 feeds the second 50 cycle alternating current voltage into the double discriminator, and through the electronic relay EBC80 to the holding coil $m_3$ thereby holding the arm of the magnetic relay R in the upper position. The lamp L2 will then be illuminated and the button B1 can be released. The signal from the double discriminator will then cause the variable field winding of the motor M1 to be energized to move the motor M1 and the ganged controls thereof so that the variable capacitors $C_2$ and $CV_1$ are moved toward the tuned position of the discriminator. When this point is reached, the electronic relay EBC80 shunts off the voltage to the holding coil $m_3$ and the arm R of the magnetic relay returns to the midposition.

During the period that the arm has been in the upper position, the contacts S55, S56 and S57 have been closed, thus insuring balance of the three-phases of the current from the three-phase generator. Likewise, since the switch S53 has been open, the motors M3 and M4 have remained inactive.

During the same period of time, the variation of the capacitor $CV_1$ has varied the oscillations of the oscillator $O_T$, thus varying the output of the three-phase generator, and gradually building up the speed of the motor 4. The output of the three-phase generator is amplified as it is fed through the driver stage 2 and the output stage 3, until it is fed to the motor 4.

Should the casing for the ultracentrifuge be open, or the vacuum apparatus not be functioning, the switch S4 or the switch S5 will be open, thereby preventing energizing of the holding coil $m_3$. Release of the starting magnetic relay to the central position at which point the apparatus will cease to function. Further, should the starting button B1 be held down, the terminal disc switch S10 will open the contact switches S11 and S11a, thus deenergize the coil $m_2$, and preventing the apparatus from operating further.

Should the cooling water not be functioning properly, switch S2 will close, and coil $m_1$ will pull the arm of relay R down, and the apparatus will be braked to a halt.

Moreover, should the electronic relay for some reason fail to shut the signal from the discriminator off when the maximum permissible speed is reached, the cam switch S12 will close the contact switch S13 shorting out the holding coil $m_3$ allowing the arm of relay R to return to the mid position and permitting the apparatus to run at a steady speed.

When the arm of the magnetic relay R has returned to the central position, the contact switch S53 will close, thus energizing the motors M3 and M4 and starting the rotation of the programing means S21 and the timer or revolutions counting mechanism. At the same time, the opening of the contact switch S52 will extinguish lamp L2, and the closing of contact S54 will illuminate lamp L3, indicating running at the steady speed. Closing of contact switches S58, S59 and S60 will insure balance of the three-phases fed to the motor for the ultracentrifuge.

The temperature during this period will be indicated by the temperature indicator $I_1$ on the control panel, this having been moved by the motor M2 which operates to balance the bridge containing the temperature responsive resistance NCTP/1K3.

Should it be desired to slow the speed down temporarily, the knob $K_5$ is turned to move the switch S6 to the left. This temporarily energizes the coil $m_1$ moving the arm of the magnetic relay R down, thus closing the contact switch S51 and feeding a second 50 cycle A.C. voltage to the discriminator and causing the motor M1 to move so that the capacitor $CV_1$ is varied in the direction such that the oscillations of the oscillator $O_T$ change to reduce the speed of the ultracentrifuge motor 4. When the desired lower speed is reached, the knob $K_5$ is returned to its initial position, at which time the discriminator will automatically move motor M1 to return the capacitor $CV_1$ to the correct position by balancing the capacitors $C_1$ and $C_2$ and thus tuning the discriminator.

Should it be desired to change the speed permanently, it is only necessary to turn the knob $K_1$ which will change the setting of capacitor $CV_2$. This changes the total capacitance impressed on the oscillator $O_T$ but it does not change the conditions which will cause the discriminator to keep the ganged controls driven by motor M1 fixed on the proper speed. Thus the ganged controls will be caused to keep the newly set speed.

At any time during the steady running of the apparatus, the cam switch S12 can be set to close contact switches S14 and S15, thus energizing coils $m_4$ and $m_5$ to close switches S16 and S17 and energize circuits controlled thereby to actuate photographic apparatus etc.

Should it be desired to check the accuracy of the temperature recording means or the functioning of the discriminator in setting the proper speed, knob $K_3$ can be turned to set switch 18 in the desired position, at which point the glow from tube EMM840 can be observed in the window provided in the control panel. Similarly, to check the balance of individual phases, the knob $K_4$ is actuated to set the switch S19 in the desired position, at which point the glow from the tube EMM801 is observed in the window provided therefor in the control panel.

When the programing means S21 has reached the end of the rotation for which it was set, it closes switches S62 and opens S61. Switch S61 prevents coil $m_2$ from being energized and permits energizing of coil $m_1$, thus moving the arm of the magnetic relay R to the down position and closing switches S51 and S52a. Switch S51 feeds a second 50 cycle A.C. voltage to the double discriminator which causes the motor M1 to move in a direction to change the capacitance of the variable capacitor $CV_1$ so that the oscillations of oscillator $O_T$ reduce the speed of the ultracentrifuge motor 4. At the same time the circuit through lamp L4 is closed, thus lighting this lamp indicating that the motor 4 is being braked. At the same time, the switch S54 is open, thus stopping the running of motors M3 and M4. The closing of switch S62 energizes motor M5, which rotates in the opposite direction from motor M4 to reset the timer or revolutions counter mechanism.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. An apparatus for automatic driving of a three-phase alternating current motor, comprising amplifier means for each of the three phases of current supply, a variable capacitor controlled electronic three-phase generator for generating a three-phase alternating current which is variable in frequency from zero to an upper limit, said generator being connected to each of said amplifier means for feeding one phase of the three-phase current to each amplifier means, control means having variable capacitors therein connected to said three-phase generator, said control means further having driving means connected to said variable capacitors for automatically varying the capacitances thereof, settable switching means interconnected with said variable capacitors, settable timer means interconnected with said switching means for timing the sequence of switching operations, electronic discriminator means to which said variable capacitors are also connected, said discriminator means being connected to said driving means for driving said driving means in response to the varying of said variable capacitors, and a plurality of feeder networks connected to said amplifier means, said three-phase generator, said control means and said discriminator means for converting a single-phase alternating current to direct current and a plurality of alternating currents at a plurality of voltages.

2. An apparatus as claimed in claim 1 in which said variable capacitor controlled electronic three-phase generator comprises a variable oscillator the output frequency of which is controlled by varying the capacitance imposed on said oscillator, and said control means comprises a pair of variable capacitors, said driving means being a rotating field motor connected to said capacitors for varying their capacitance, a hand settable variable capacitor connected to one capacitor of said pair of variable capacitors, said hand settable capacitor and said one capacitor being connected to said oscillator, said control means further comprising an additional capacitor to which the other capacitor of said pair of variable capacitors is connected, said other variable capacitor and said additional capacitor being connected to said discriminator means, the output of said discriminator means being connected to the variable field winding of said rotating field motor for varying the current in said field winding to change the capacitances of said variable capacitors.

3. An apparatus as claimed in claim 2 in which said control means further comprises relay means connected to two sources of alternating current voltage having opposite phases in one of said feeder networks and to said discriminator means, said switching means actuating said relay to connect an alternating current voltage of one phase of the two phases to said discriminator means for causing said discriminator means to impose a signal on the field winding of said rotating field motor to change the capacitances of said variable capacitors, an alternating current voltage of one phase causing a change of the capacitances of said variable capacitors toward the tuning point of said discriminator means, and an alternating current voltage of the other phase causing a change of the capacitances of said variable capacitors away from the tuning point of said discriminator means, and said discriminator means having electronic switching means connected to said switching means for actuating said switching means to move said relay means to disconnect the source of alternating current voltage when the capacitances of said variable capacitors approach the tuning point of said discriminator means.

4. An apparatus for automatic driving of a three-phase alternating current motor for an ultracentrifuge, comprising amplifier means for each of the three phases of current supply, a variable capacitor controlled electronic three-phase generator for generating a three-phase alternating current which is variable in frequency from zero to an upper limit, said generator being connected to each of said amplifier means for feeding one phase of the three-phase current to each amplifier means, control means having variable capacitors therein connected to said three-phase generator, said control means further having driving means connected to said variable capacitors for automatically varying the capacitances thereof, settable switching means interconnected with said variable capacitors, fixed capacitor means energized by said settable switching means and connected between said three-phase generator and said amplifier means for holding the phases of said three-phase current fixed in relation to each other, settable timer means interconnected with said switching means for timing the sequence of switching operations, a motor casing switch in said settable switching means for breaking the interconnection of said settable switching means with said variable capacitors, a vacuum responsive switch in said settable switching means for breaking the interconnection of said settable switching means with said variable capacitors, electronic discriminator means to one portion of which said variable capacitors are also connected, said discriminator means being connected to said driving means for driving said driving means in response to the varying of said variable capacitors, temperature measuring means interconnected with the other portion of said discriminator means, said temperature measuring means having an adjustable bridge with a temperature variable resistance therein and having a variable potentiometer having potentiometer driving means actuated by the other portion of said discriminator means, said bridge being connected to said other portion of said discriminator means to feed a signal thereto, braking switching means actuated by said settable timer means and connected to said settable switching means for supplying a signal to said discriminator means for moving said driving means for changing the capacitances of said variable capacitors to reduce the speed of the motor, shut-off switch means actuated by said driving means for actuating said settable switching means to stop the running of the motor, a discriminator checking means connected to the output of said discriminator means for checking the output of the portions of said discriminator means, and a plurality of feeder networks connected to said amplifier means, said three-phase generator, said control means and said discriminator means for converting a single-phase alternating current to direct current and a plurality of alternating currents at a plurality of voltages.

No references cited.